(12) United States Patent
Schieler et al.

(10) Patent No.: US 11,611,118 B2
(45) Date of Patent: Mar. 21, 2023

(54) METHOD FOR ASSEMBLING A TRACTION BATTERY FOR AN ELECTRICALLY OPERATED VEHICLE

(71) Applicant: AUDI AG, Ingolstadt (DE)

(72) Inventors: Oliver Schieler, Gaimersheim (DE); Marc Gormanns, Erlenbach (DE); Pedro De Sousa Schmiech, Leingarten (DE)

(73) Assignee: AUDI AG, Ingolstadt (DE)

( * ) Notice: Subject to any disclaimer, the term of this patent is extended or adjusted under 35 U.S.C. 154(b) by 293 days.

(21) Appl. No.: 17/083,782

(22) Filed: Oct. 29, 2020

(65) Prior Publication Data
US 2021/0143382 A1 May 13, 2021

(30) Foreign Application Priority Data

Nov. 11, 2019 (DE) .......................... 102019130384.2

(51) Int. Cl.
| | |
|---|---|
| *H01M 10/653* | (2014.01) |
| *H01M 50/10* | (2021.01) |
| *H01M 50/209* | (2021.01) |
| *H01M 50/249* | (2021.01) |
| *H01M 10/613* | (2014.01) |
| *H01M 10/625* | (2014.01) |

(52) U.S. Cl.
CPC ....... *H01M 10/653* (2015.04); *H01M 10/613* (2015.04); *H01M 10/625* (2015.04); *H01M 50/10* (2021.01); *H01M 50/209* (2021.01); *H01M 50/249* (2021.01); *H01M 2220/20* (2013.01)

(58) Field of Classification Search
None
See application file for complete search history.

(56) References Cited

U.S. PATENT DOCUMENTS

| | | |
|---|---|---|
| 2013/0101881 A1 | 4/2013 | Syed et al. |
| 2014/0079974 A1 | 3/2014 | Schmidt et al. |
| 2018/0026321 A1* | 1/2018 | Rhodes ............. H01M 10/6556 429/120 |

FOREIGN PATENT DOCUMENTS

| | | |
|---|---|---|
| CN | 101944643 A | 1/2011 |
| CN | 105359331 A | 2/2016 |

(Continued)

OTHER PUBLICATIONS

Abstractor DE-102013201102-A1. (Year: 2014).*

(Continued)

*Primary Examiner* — Gregg Cantelmo
(74) *Attorney, Agent, or Firm* — Maier & Maier, PLLC (57) ABSTRACT

A method for assembling a traction battery for an electrically operated vehicle, in which at least one battery module is inserted into a battery housing in a module setting process, with the formation of an air gap between the battery module and a housing base of the battery housing, which is filled with a highly viscous thermal paste, which builds up a viscosity force due to internal friction when it is distributed in the air gap, which acts on the housing base until the thermal paste is distributed in the air gap by the flow of material and the accompanying reduction in the viscosity force. The housing base is supported on its housing base lower side by a counter holder in order to limit a deflection of the housing base due to the viscosity force of the thermal paste.

9 Claims, 11 Drawing Sheets

(56) References Cited

FOREIGN PATENT DOCUMENTS

| | | | |
|---|---|---|---|
| CN | 107785512 A | 3/2018 | |
| CN | 108780934 A | 11/2018 | |
| CN | 208142308 U | 11/2018 | |
| CN | 109638200 A | 4/2019 | |
| CN | 109873101 A | 6/2019 | |
| CN | 110402503 A | 11/2019 | |
| DE | 102013201102 A1 * | 8/2014 | .......... H01M 10/625 |
| DE | 102016217895 A1 * | 3/2018 | .......... H01M 10/613 |
| DE | 102018208070 A1 * | 11/2019 | |
| EP | 2 530 778 A1 | 12/2012 | |
| EP | 3264494 A1 | 1/2018 | |

OTHER PUBLICATIONS

Abstractor DE-102016217895-A1 (Year: 2018).*
Abstract ot DE-102018208070-A1 (Year: 2019).*
Office Action dated Sep. 2, 2022, in connection with corresponding Chinese Application No. 202011247831.0 (13 pp.).
German Search Report dated Sep. 7, 2020 in corresponding German Application No. 102019130384.2; 8 pages; Machine translation attached.

* cited by examiner

METHOD FOR ASSEMBLING A TRACTION BATTERY FOR AN ELECTRICALLY OPERATED VEHICLE

FIELD

The invention relates to a method for assembling a traction battery for an electrically operated vehicle and an assembly device for carrying out the method.

BACKGROUND

The traction battery of an electrically operated vehicle has battery cells, which are each assembled as a cell composite into cuboid battery modules. A number of such battery modules are arranged in a battery housing. The battery housing can be installed on the vehicle lower side and can extend over a large area in the vehicle longitudinal direction between the front axle and the rear axle and in the transverse direction of the vehicle between the two side rocker panels.

In the case of a generic automated battery assembly, a still empty battery housing is initially provided, which is open at the top in the housing vertical direction. The battery housing has a large-area housing base from which housing side walls are raised at the edge. Intermediate walls, which divide the battery interior into subspaces into which the battery modules are insertable, extend inside the battery housing.

In the assembly process, the still empty battery housing is placed with its housing base on a counter holder and equipped with the battery modules in a module setting process. In the module setting process, the battery modules are inserted into the battery housing from above in one setting direction and screwed into it. For reasons of tolerance, an air gap remains between the battery modules and the housing base. When the traction battery is assembled, this gap is filled with a highly viscous thermal paste in order to ensure increased thermal conductivity between the battery modules and the housing base.

In one process variant, the thermal paste can already be applied to the housing base before the module setting process is carried out. During the setting process, the respective battery module is pressed against the thermal paste with a pressing force, whereby it is uniformly distributed in the air gap while being compressed. In an alternative process variant, the setting process is followed by an injection process, in which the thermal paste is injected into the air gap formed between the battery modules and the housing base. During the compression or in the injection process, a viscosity force builds up in the thermal paste due to its internal friction (i.e. due to its reduced flowability). This acts against the bottom of the housing until the thermal paste is distributed in the air gap by the flow of material, which is accompanied by a reduction in the viscosity force. In order to limit a change of the surface contour of the housing base during the compression or the injection process, the battery housing is supported on the counter holder.

In mass production, a plurality of battery housings are supplied to the module setting process, the housing bases of which have irregularities or deformations of varying degrees. These possibly act as interfering contours in the module setting process, which can negatively affect the setting process. This can lead to an increased cost of materials for the thermal paste, an increase in the housing component height, and an impairment of the battery performance.

A battery module is known from US 2014/0079974 A1. A corrugated rib battery module is known from US 2013/0101881 A1. A cell module is known from EP 2 530 778 A1.

SUMMARY

The object of the invention is to provide a method for assembling a traction battery for an electrically powered vehicle and an assembly device for carrying out such a method, with the aid of which the module setting process during battery assembly can be improved in a simple manner in comparison to the prior art.

The invention is based on the fact that in the prior art the counter holder support surface on which the housing base rests is designed to be dimensionally stable. Therefore, in the prior art, there is no adaptation of the counter holder to the surface contour of the respective housing base. As a departure from this, according to the characterizing part of claim 1, the counter holder can be switched between an impression operating position and a supporting operating position, wherein a counter holder support surface is adjustable in a dimensionally flexible manner, in particular elastically yielding, in the impression operating position, so that the counter holder support surface adapts to a surface contour of the housing base lower side, and wherein in the supporting operating position, the counter holder support surface, which is adapted to the contour of the housing base lower side, is dimensionally stable, so that the counter holder support surface supports the housing base against the viscosity of the thermal paste.

In one preferred embodiment, the dimensionally flexible counter holder support surface in the impression operating position forms a negative shape of the surface contour of the housing base lower side, so that a large-area, gap-free contact is established between the housing base lower side and the counter holder support surface adapted to the contour thereof. This has the advantage that the housing base is supported over its entire surface.

The counter holder preferably has a plurality of counter holder segments, which are mounted vertically adjustable independently of one another in a counter holder main body, and in the impression operating position, the segment surfaces of the counter holder segments are brought into contact with the housing base lower side, and in particular the segment surfaces of all counter holder segments form the counter holder support surface. A nearly seamless counter holder support surface results due to the plurality of the counter holder segments, which ensures a further improved support of the housing base.

In one embodiment of the invention, the counter holder segments in the supporting operating position are adjusted into their impression stroke position, in which the segment surfaces of the counter holder segments are in contact with the housing base lower side. With a suitable selection of the restoring elements described below, this adjustment takes place almost without force, whereby it is advantageously ensured that the counter holder segments cling to the housing base lower side with almost no force or gaps.

The counter holder can preferably have a mounting frame, which moves around the counter holder segments, and/or the battery housing can be positioned on the edge on the mounting frame in the module setting process, and/or the counter holder can be located in its impression operating position, in which the counter holder segments adapt to the surface contour of the housing base lower side, when the battery housing is placed on the mounting frame. This has the advantage that the counter holder segments are in an optimal starting position in order to adapt to the surface contour of the housing base lower side.

Optionally, the counter holder can have a locking unit, in particular a clamping unit, by means of which the vertically-adjustable counter holder segments are fixed in their impression stroke position in the supporting operating position. The clamping unit can be hydraulically, electrically, or pneumatically actuatable. This has the advantage that the counter holder segments can exert a supporting effect on the housing base.

The counter holder segments can preferably be spring-loaded by means of restoring springs, and/or the counter holder segments can be adjusted into their impression stroke position while building up an elastic restoring force. This has the advantage that, after the traction battery has been removed, the counter holder segments automatically spring back from the impression stroke position to their original position. As an alternative to the restoring springs, hydraulic, pneumatic, or mechanical actuators can also be used.

Particularly preferably, the restoring force of the restoring springs can be selected exactly so that the counter holder segments exert only a small, in particular no force on the housing base lower side during the vertical adjustment into their impression stroke position and the counter holder segments are in contact with the housing base lower side with almost no force, in particular no force, during the stroke adjustment. This advantageously prevents the housing base lower side from being deformed under the action of the restoring force when it is placed on the counter holder.

In addition, the thermal paste can be applied to the module setting process on the housing base of the battery housing, so that during the setting process, the respective battery module is pressed with a pressing force against the thermal paste, whereby it is uniformly distributed in the air gap while being compressed.

As an alternative to application, the thermal paste can be injected into the air gap between the battery module and the housing base after the module setting process in an injection process.

An assembly device for carrying out a method according to the above-mentioned aspects of the invention is also according to the invention.

BRIEF DESCRIPTION OF THE FIGURES

Exemplary embodiments of the invention are described hereinafter on the basis of the appended figures.

In the figures.

DETAILED DESCRIPTION

Figure 1:
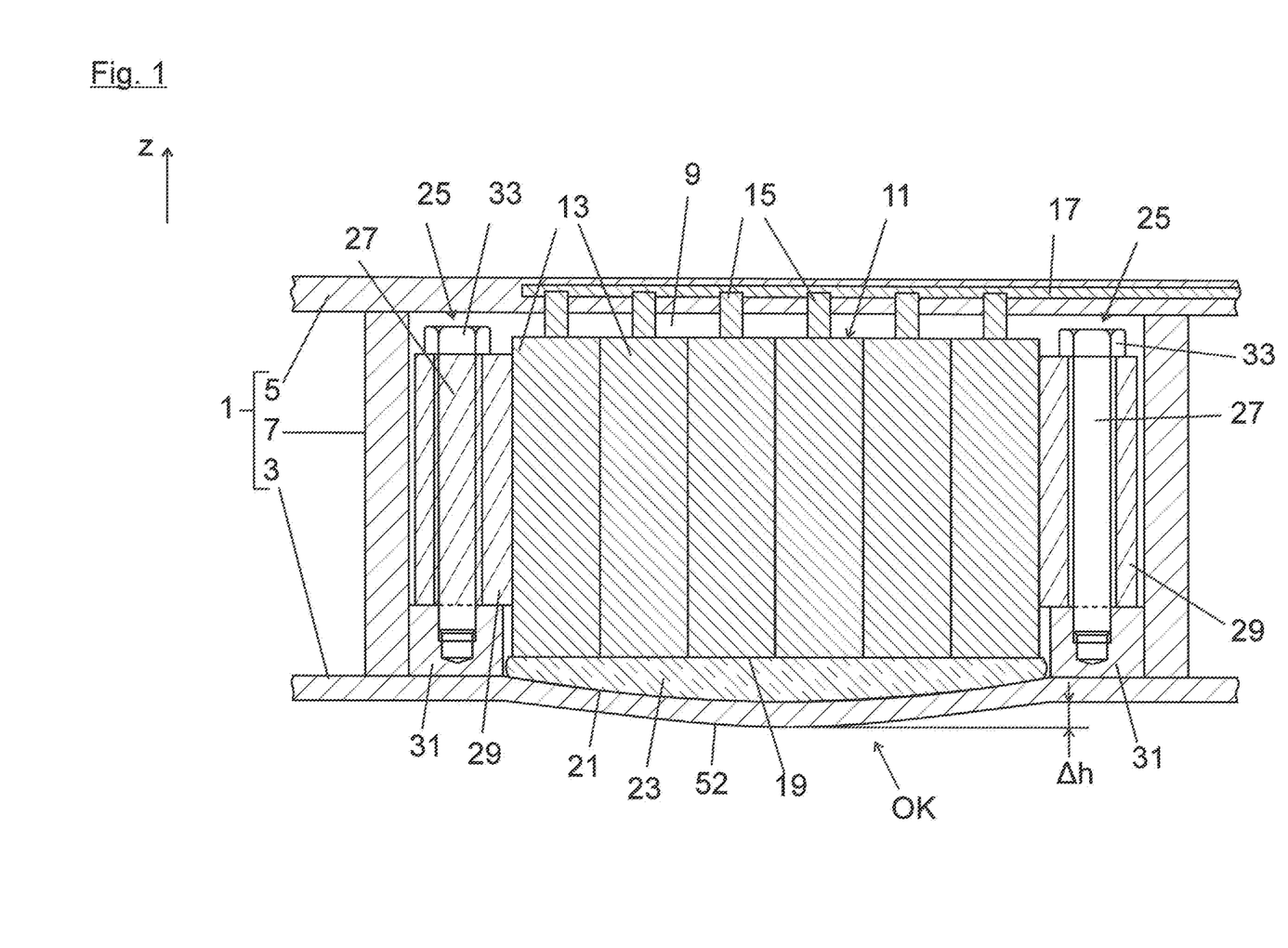
FIG. 1 shows a detail of an assembled traction battery in a partial sectional view.

A partial sectional view of a fully assembled traction battery is shown in FIG. 1. The traction battery is shown only insofar as it is necessary for understanding the invention. The traction battery has a battery housing 1 which is closed in the housing vertical direction z at the bottom by a large-area housing base 3. The battery housing 1 is closed in the housing vertical direction z at the top by a housing cover 5. Between the housing base 3 and the housing cover 5, intermediate walls 7 and housing side walls (not shown) extend in the housing vertical direction z, which form a subspace 9 of the battery interior together with the housing base 3 and the housing cover 5. A cuboid battery module 11 is inserted in the subspace 9.

In the battery module 11, multiple battery cells 13 are combined to form a cell assembly. The battery cells 13 have battery poles 15 protruding upward in the housing vertical direction z, via which the battery cells 13 can be electrically contacted. The battery poles 15 are electrically connected to an electric drive (not shown) of an electrically operated vehicle by means of a busbar 17 extending, for example, in the housing cover 5.

A thermal paste 23 is introduced between a battery module lower side 19 and a housing base upper side 21, which is in full-surface contact both with the battery module lower side 19 and also with the housing base upper side 21. Heat arises during operation of the traction battery, which is emitted via the thermal paste 23 into the housing base 3. From there, the heat can be dissipated via cooling structures (not shown), which can be arranged in the housing base 3 or in the housing vertical direction z below the housing base 3.

In the subspace 9, the battery module 11 is screwed to the battery housing 1 via screw points 25. At these screw points 25, a fastening flange 29 of the battery module 11 is screwed to a corresponding fastening bracket 31 via a screw 27. The fastening flange 29 is clamped between a screw head 33 of the screw 27 and the fastening bracket 31.

The traction battery shown in FIG. 1 is assembled in an assembly process indicated on the basis of FIGS. 4 to 9. During the assembly process, the traction battery is positioned on a counter holder 35 shown in FIGS. 2 and 3.

Figure 2:
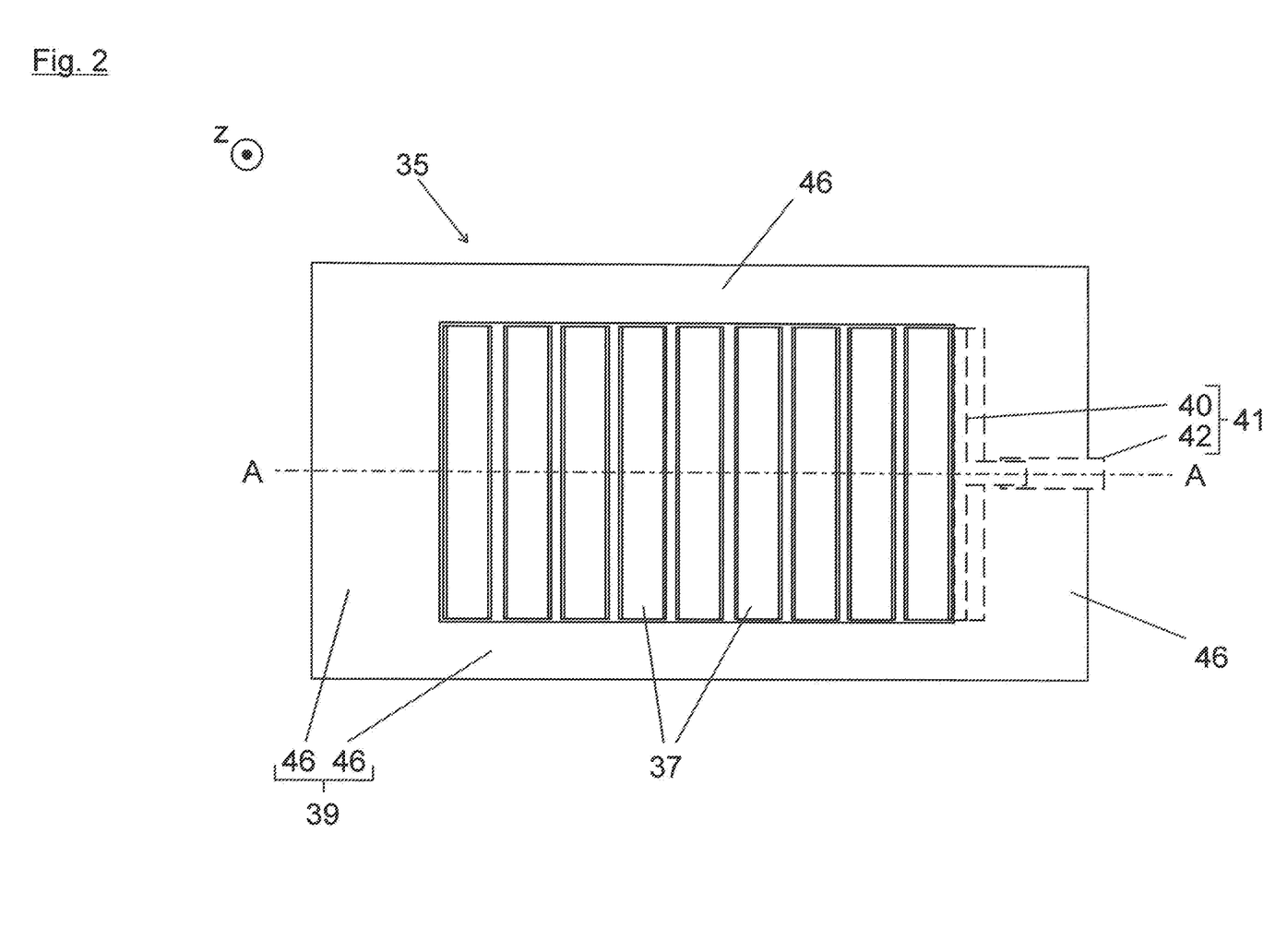
FIG. 2 shows a counter holder of an assembly device in a view from above.
Figure 3:
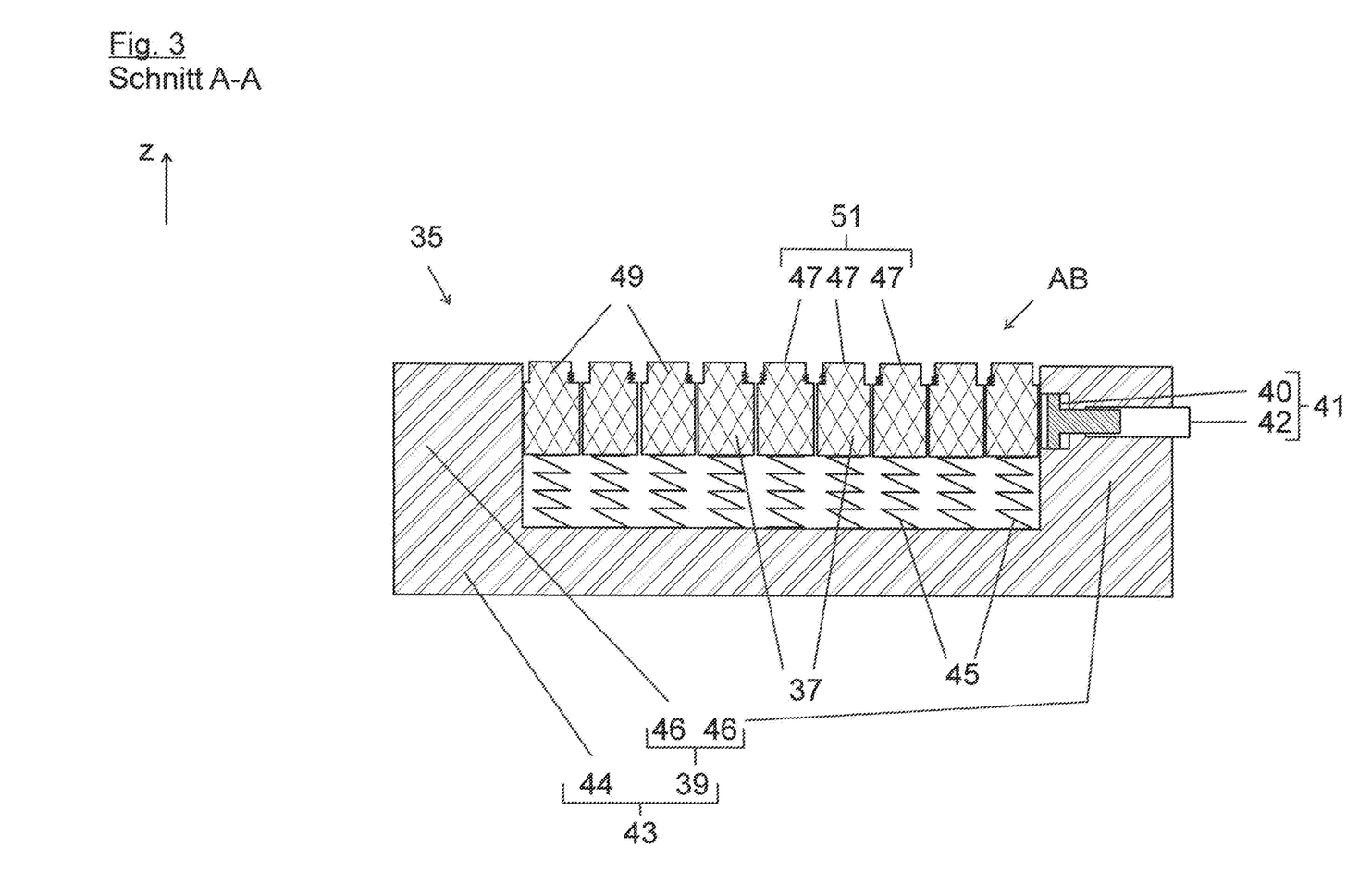
FIG. 3 shows the counter holder along sectional plane A-A from FIG. 2 in a lateral sectional view.

The counter holder 35 shown in a view from above in FIG. 2 has, by way of example, nine strip-shaped counter holder segments 37, which extend in parallel to one another. As shown in FIG. 3, the counter holder 35 has a counter holder base body 43, which is constructed from a counter holder base 44 and counter holder side walls 46 raised from it. The counter holder side walls 46 together form a circumferential mounting frame 39 of the counter holder base body 43.

The counter holder segments 37 are mounted in the counter holder main body 43 so they are stroke-adjustable in the housing vertical direction z independently of one another via restoring springs 45. The counter holder segments 37 each have an elastically yielding segment head 49 on their upper sides.

A core of the invention is that when the battery housing 1 is placed on the mounting frame 39 (FIG. 4), the counter holder segments 37 are dimensionally-flexibly adjustable into an impression stroke position AH while adapting to a surface contour OK of the housing base lower side 52.

A clamping unit 41 is provided in the mounting frame 39, using which the counter holder segments 37 are fixable in an impression stroke position AH, so that the counter holder segments 37 are no longer movable in the housing vertical direction z. Purely by way of example, the clamping unit 41 is shown as a hydraulically actuated clamping unit 41 having a hydraulic piston 40 and a hydraulic cylinder 42.

Figure 4:
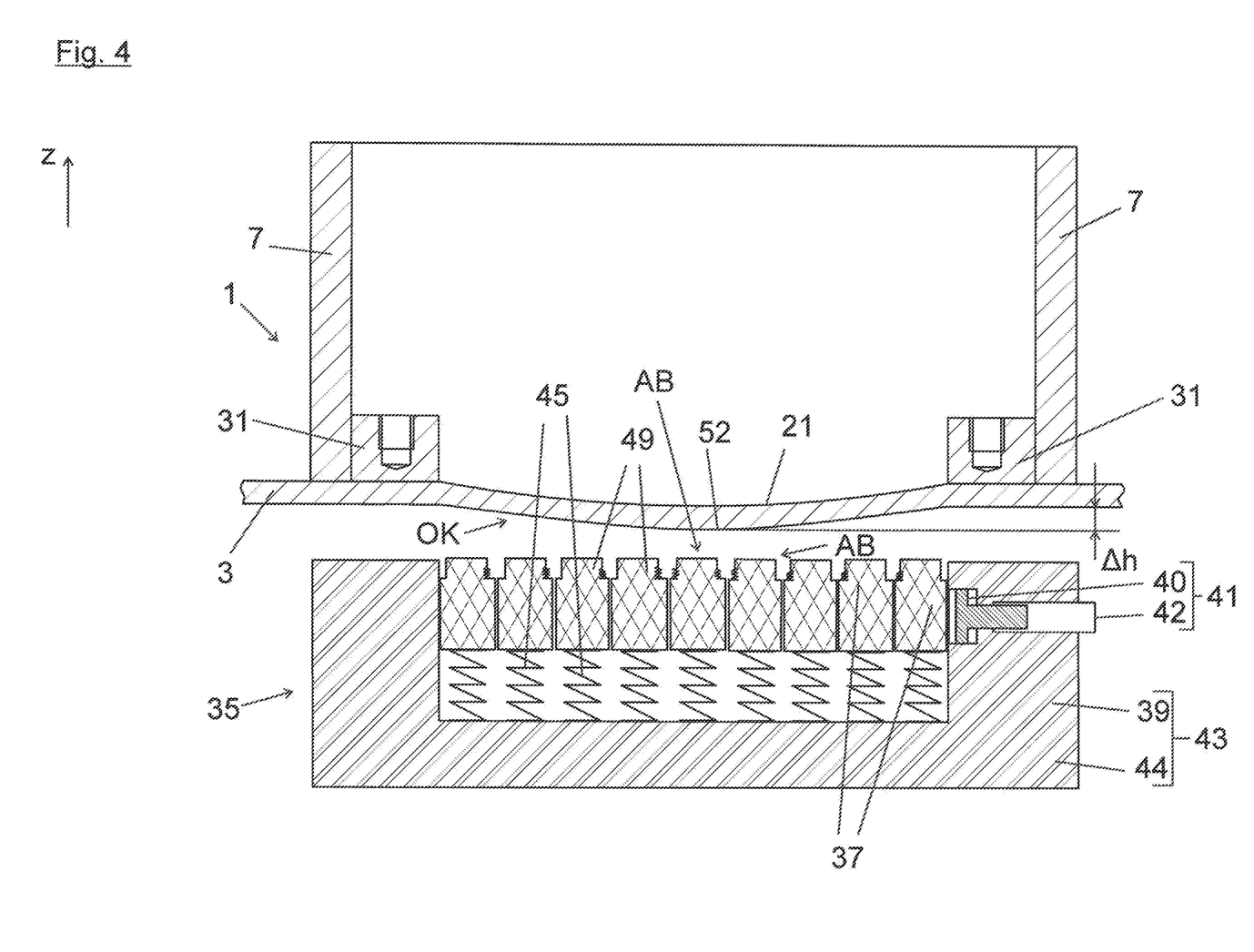
FIG. 4 shows a view corresponding to FIG. 1, on the basis of which a battery assembly is illustrated.

In FIG. 4, an initially still empty battery housing 1 is provided, which is positioned above the counter holder 35 in such a way that the intermediate walls 7 are aligned with the mounting frame 39 in the housing vertical direction z. A surface contour OK of the housing base 3 has an unevenness Δh in the region below the battery module 11 due to tolerance. For better recognizability, the unevenness Δh is shown greatly exaggerated in the figures.

The counter holder segments 37 are in their uppermost position in the housing vertical direction z. In addition, the counter holder 35 is in its impression operating position AB, in which the counter holder segments 37 are stroke-adjustable in the housing vertical direction z, so that the segment surfaces 47 of the counter holder segments 37 form a dimensionally-flexible counter holder support surface 51.

The battery housing 1 is placed on the counter holder 35 in FIG. 4 until the housing base 3 rests on the mounting frame 39. During the placement, the counter older segments 37 are adjusted downward in the housing vertical direction z into their impression vertical position AH while building up an elastic restoring force in the restoring springs 45 The restoring force of the restoring springs 45 is chosen for this purpose exactly so that the counter holder segments 37 do not exert any force on the housing base lower side 52 during the stroke adjustment into their impression stroke position AH and the counter holder segments 37 are in contact with the housing base lower side 52 without force during the stroke adjustment of the counter holder segments 37.

Figure 5:
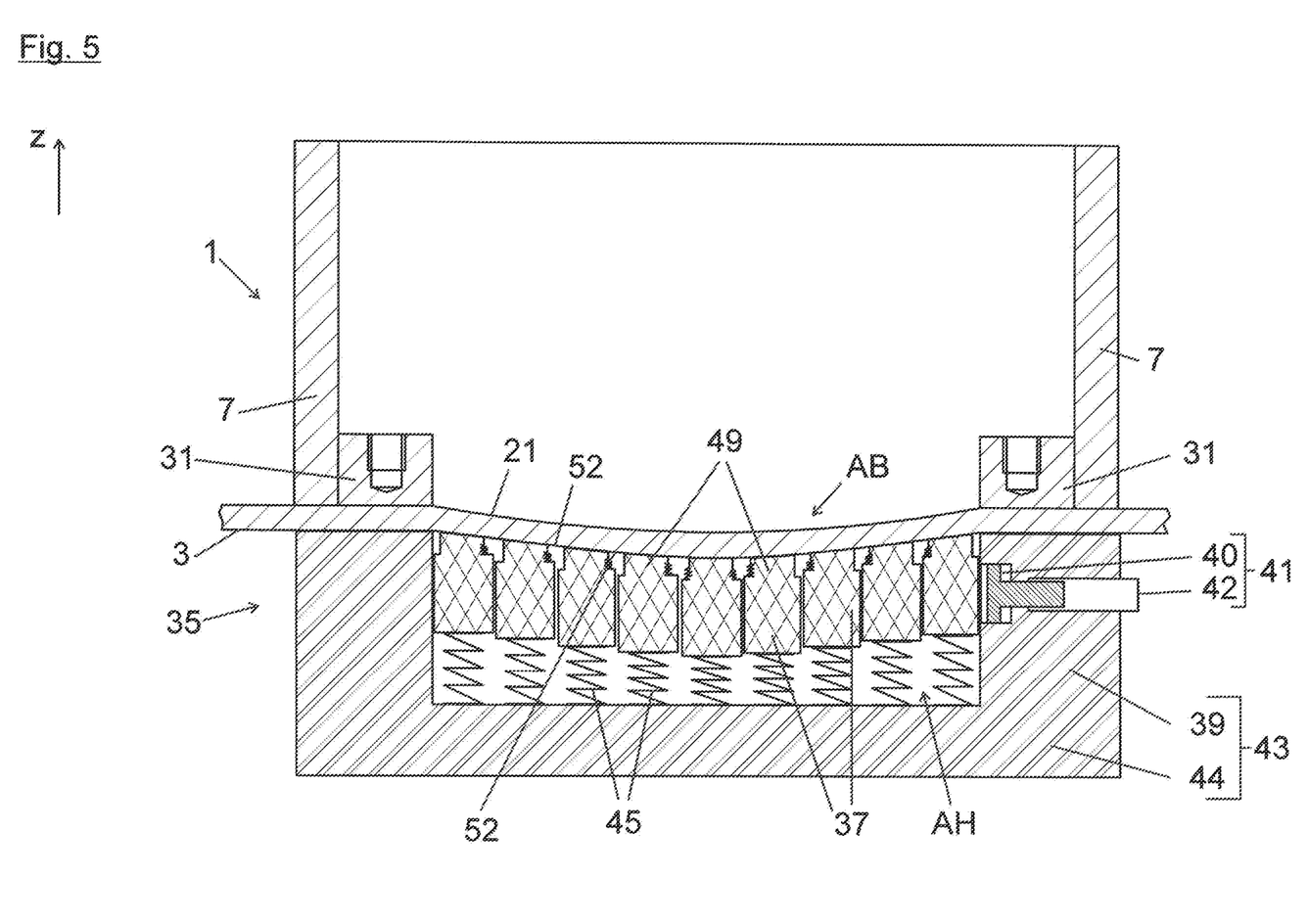
FIG. 5 shows another view corresponding to FIG. 1, on the basis of which a battery assembly is illustrated.

In FIG. 5, the battery housing 1 is placed on the counter holder 35. The battery housing 1 rests on the mounting frame 39 in such a way that the intermediate walls 7 are aligned with the mounting frame 39 in the housing vertical direction z. Due to the restoring forces and the elastically yielding segment heads 49, the counter holder segments 37 cling precisely against the surface contour OK of the housing base lower side 52 and form a negative shape of the surface contour OK, so that the housing base lower side 52 is in large-area, gap-free contact with the counter holder support surface 51 adapted to the contour.

Figure 6:
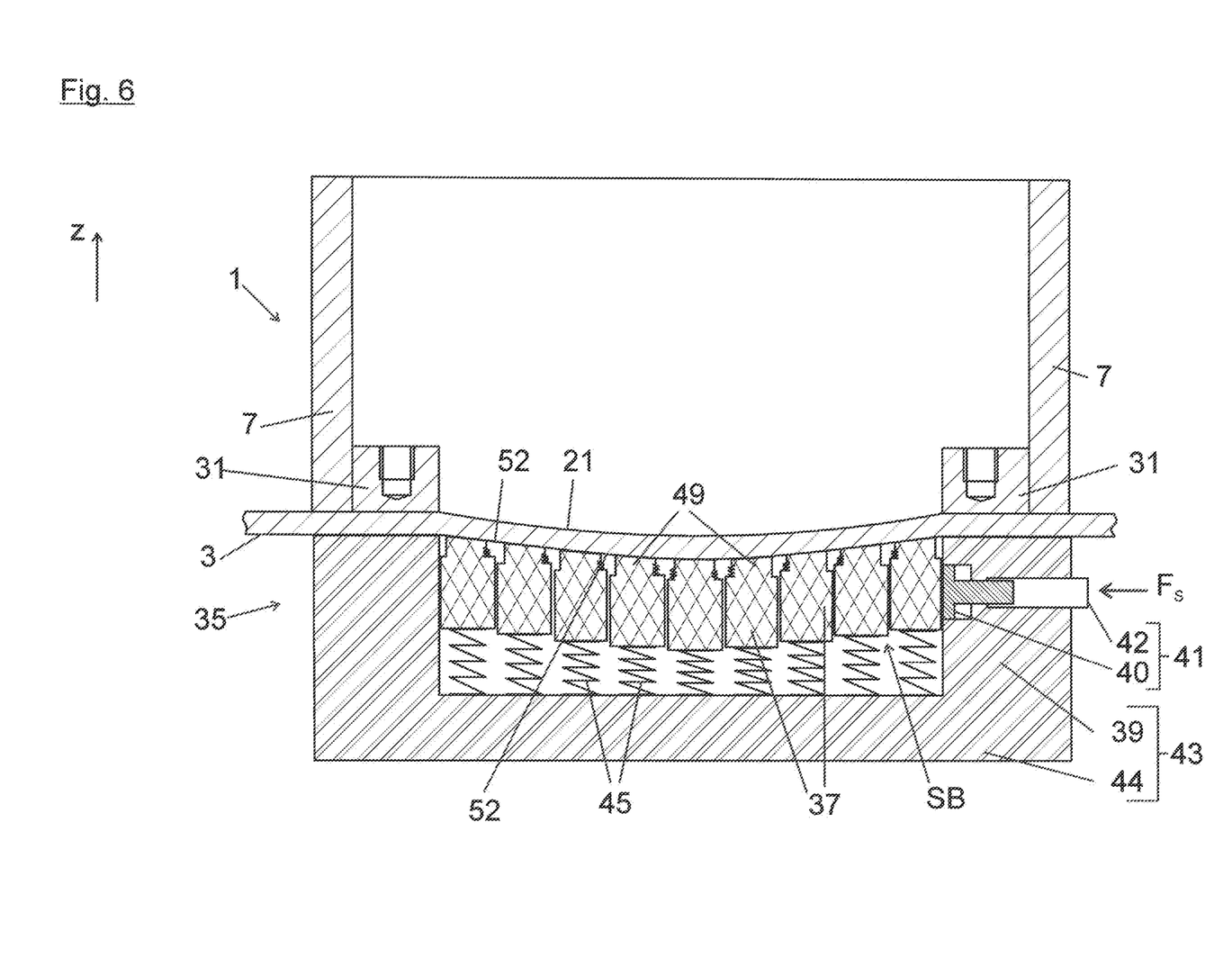
FIG. 6 shows another view corresponding to FIG. 1, on the basis of which a battery assembly is illustrated.

In FIG. 6, the counter holder 35 is transferred into its supporting operating position SB. For this purpose, the clamping unit 41 is adjusted perpendicularly to the housing vertical direction z in the direction of the counter holder segments 37, so that the counter holder segments 37 are pressed against one another and alternatively or additionally against the mounting frame 39. This creates an increased frictional force between the counter holder segments 37 on the one hand and the mounting frame 39 on the other hand, so that the counter holder segments 37 are no longer stroke-adjustable under the action of the clamping force $F_S$ generated by the clamping unit 41, but are fixed in the housing vertical direction z.

In the supporting operating position SB of the counter holder 35, the counter holder segments 37 support the housing base 3 against a viscosity force $F_V$ (FIG. 8) temporarily occurring when the thermal paste 23 is introduced.

Figure 7:
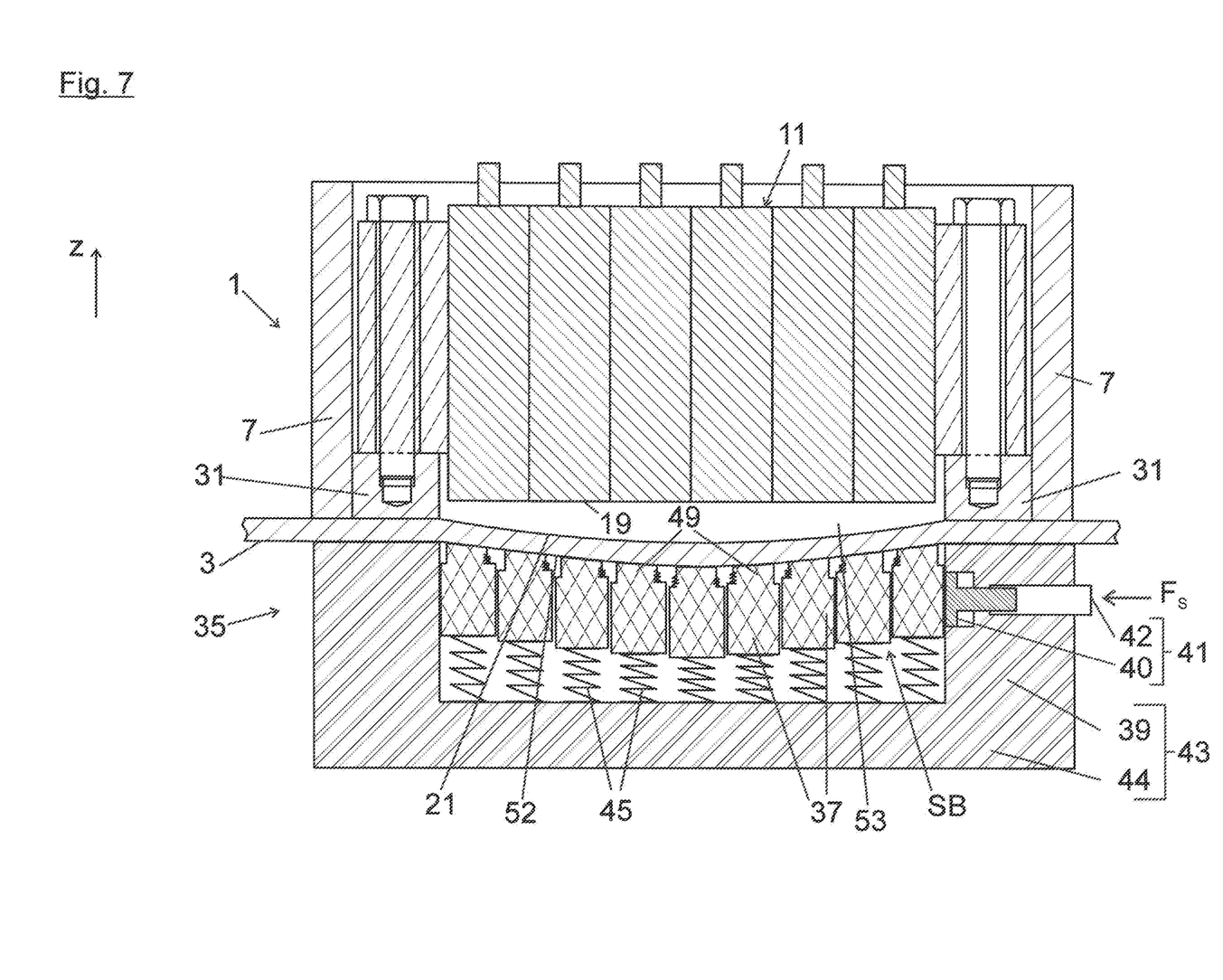
FIG. 7 shows another view corresponding to FIG. 1, on the basis of which a battery assembly is illustrated.

In FIG. 7, the battery module 11 is shown after the module setting process. The battery module 11 is screwed to the battery housing 1 on the fastening brackets 31, and a heat-insulating air gap 53 is formed between the battery module 11 and the housing base upper side 21. In order to increase heat transfer between the battery module 11 and the housing base 3, the thermal paste 23 is injected into the air gap 53.

Figure 8:
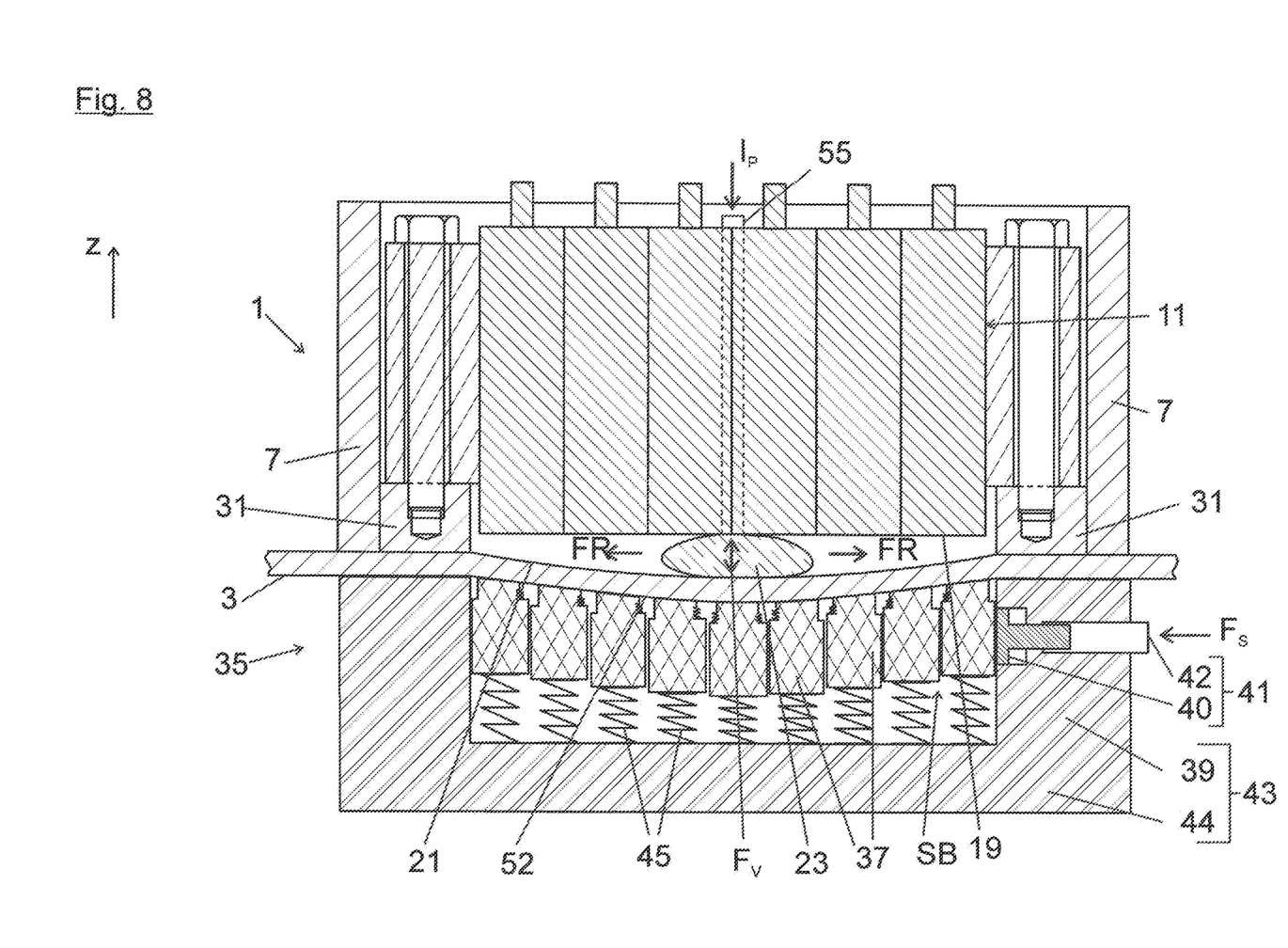
FIG. 8 shows another view corresponding to FIG. 1, on the basis of which a battery assembly is illustrated.
Figure 9:
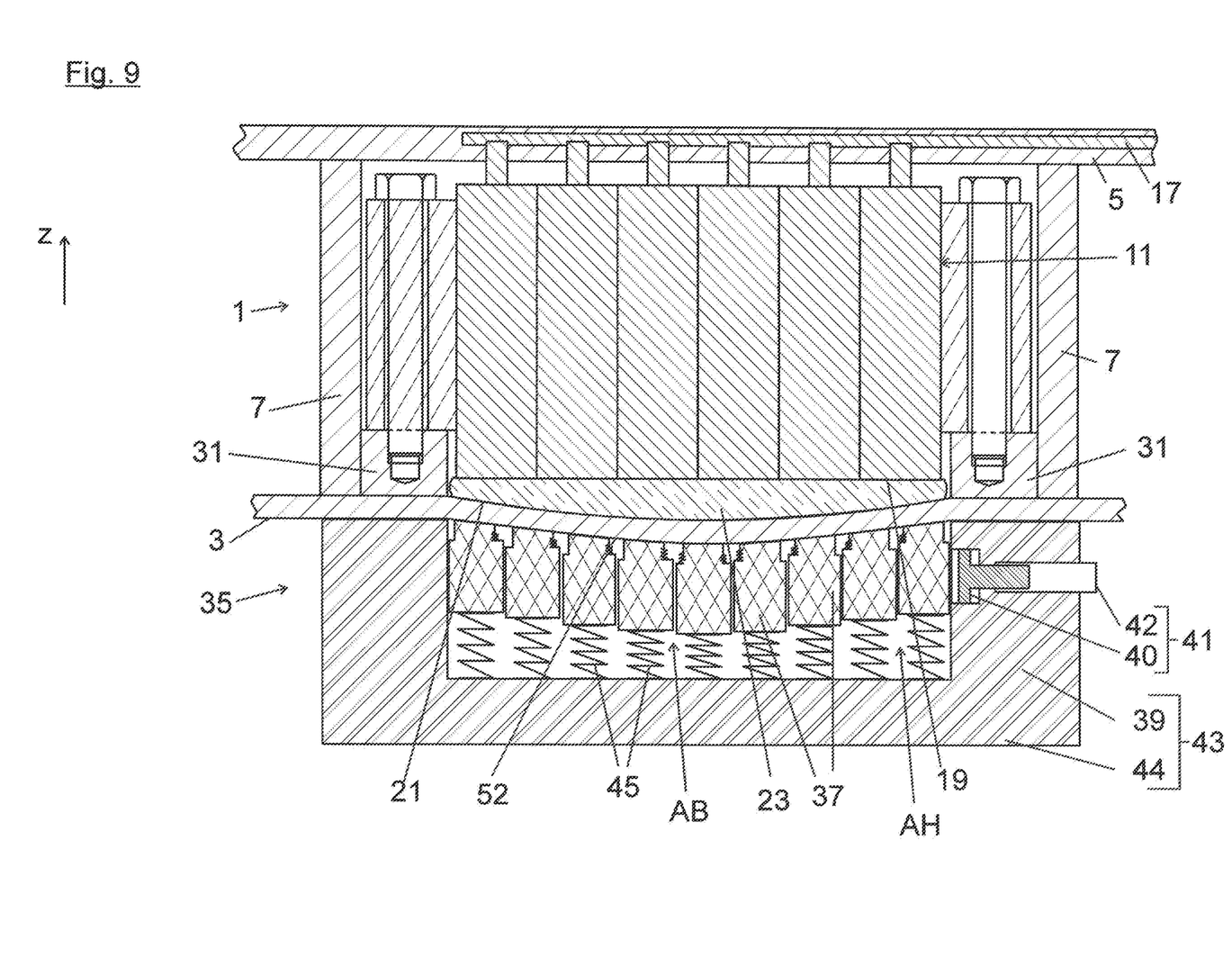
FIG. 9 shows another view corresponding to FIG. 1, on the basis of which a battery assembly is illustrated.

In FIG. 8, the injection of the thermal paste 23 into the air gap 53 via a feed channel 55 is shown. The thermal paste 23 is injected into the air gap 53 via the feed channel 55 under an injection pressure $I_P$. The thermal paste 23 has a high viscosity and is distributed only slowly in a flow direction FR in the air gap 53 upon injection due to the high internal friction of the thermal paste 23. Due to the internal friction, a viscosity force $F_V$ builds up at the beginning of the injection of the thermal paste 23, which is supported on the battery module 11 and acts downward in the housing vertical direction z on the housing base 3 The housing base 3 is supported by the counter holder 35 against the effect of the viscosity force $F_V$. With increasing distribution of the thermal paste 23, the viscosity force $F_V$ decreases towards zero. In FIG. 9, the thermal paste 23 is already completely distributed in the air gap 53 and the viscosity force $F_V$ has been completely dissipated.

The clamping unit 41 is then moved back into its starting position in the counter holder 35, whereby the counter holder 35 is transferred from the support operating position SB into the impression operating position AB. In the impression operating position AB, the counter holder segments 37 are again stroke-adjustable in the vertical direction z of the housing and, due to the restoring forces applied by the restoring springs 45, move back up to their starting position in the housing vertical direction z.

As an alternative to injecting the thermal paste 23, it is also possible to apply the thermal paste 23 to the housing base 3 before the module setting process. In this case, the battery module 11 is pressed onto the thermal paste 23 in the module setting process, whereby the thermal paste 23 is also distributed only slowly between the battery module 11 and the housing base 3 due to its high viscosity. The viscosity force $F_V$ thus also occurs and is supported by the counter holder 35. The only difference from the method in which the thermal paste 23 is injected is that the thermal paste 23 is applied to the housing base 3 before the module setting process and is not injected into the air gap 53 after the module setting process.

Figure 10:
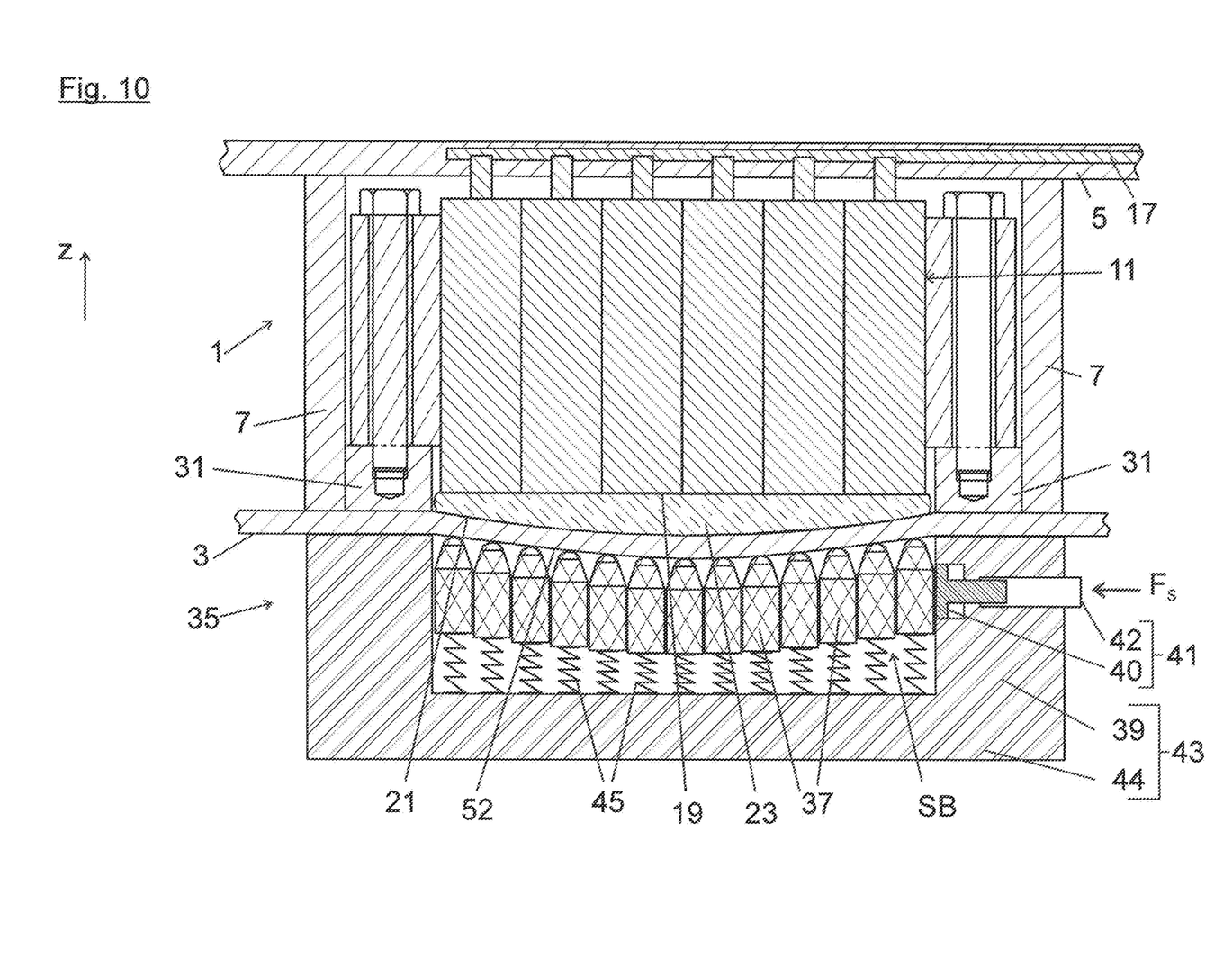
FIG. 10 shows a view corresponding to FIGS. 2 and 9 according to a second exemplary embodiment.

FIG. 10 shows the process step according to FIG. 9 using an alternative counter holder 35. The alternative counter holder 35 differs from the counter holder 35 from FIGS. 2 to 8 only in that, instead of multiple strip-shaped counter holder segments 37, pin-shaped counter holder segments 37 are used to form the counter holder support surface 51. In contrast to the strip-shaped counter holder segments 37, the pin-shaped counter holder segments 37 are semicircular on their segment surface 47, which is in contact with the housing base lower side 52, so that the pin-shaped counter holder segments 37 in their impression operating position AB are each in punctiform contact with the housing base lower side 52

Figure 11:
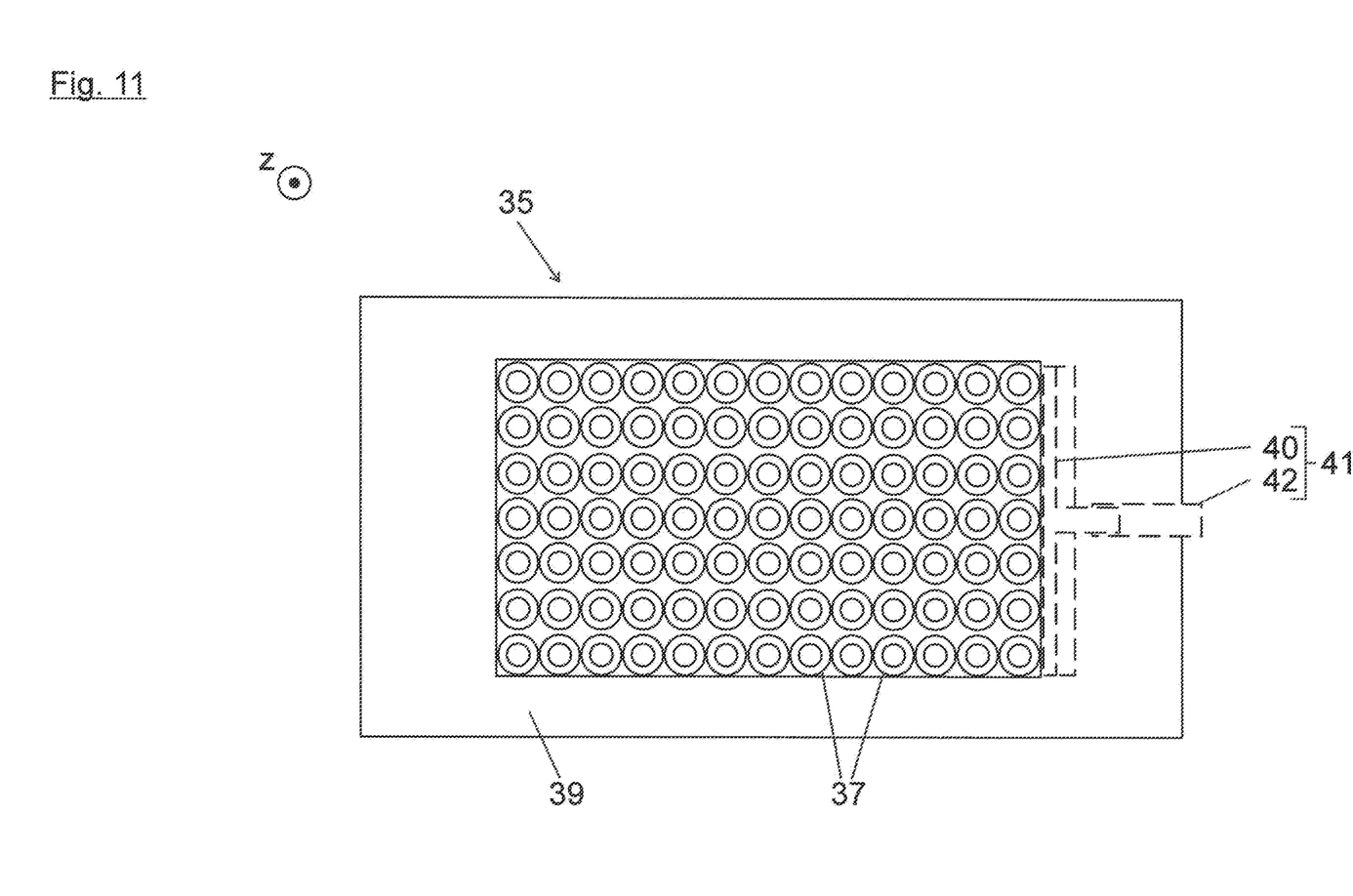
FIG. 11 shows another view corresponding to FIGS. 2 and 9 according to the second exemplary embodiment.

In FIG. 11, the alternative counter holder 35 is shown in a view from above. The alternative counter holder 35 has 91 pin-shaped counter holder segments 37, for example.

LIST OF REFERENCE SIGNS 1 battery housing
3 housing base
5 housing cover
7 intermediate wall
9 subspace 11 battery module
13 battery cell
15 battery pole
17 busbar
19 battery module lower side
21 housing base upper side
23 thermal paste
25 screw point
27 screw
29 fastening flange
31 fastening bracket
33 screw head
35 counter holder
37 counter holder segment
39 mounting frame
40 hydraulic piston
41 clamping unit
42 hydraulic cylinder
43 counter holder base body
44 counter holder base
45 restoring spring
46 counter holder side wall
47 segment surface
49 elastically yielding segment head
51 counter holder support surface
52 housing base lower side
53 air gap
55 feed channel
AB impression operating position
AH impression stroke position
$I_P$ injection pressure
SB support operating position
$F_S$ clamping force
$F_V$ viscosity force
FR flow direction
Δh unevenness
OK surface contour
z housing vertical direction

The invention claimed is:

1. A method for assembling a traction battery for an electrically operated vehicle, comprising:
at least one battery module is inserted into a battery housing from above in a setting direction during a module setting process, with a formation of an air gap between the battery module and a housing base of the battery housing, which is filled with a thermal paste, which builds up a viscosity force due to internal friction when the thermal paste is distributed in the air gap, which acts on the housing base until the thermal paste is distributed in the air gap by a flow of material and an accompanying reduction in the viscosity force, wherein the housing base is supported on a housing base lower side by a counter holder in order to limit a deflection of the housing base due to the viscosity force of the thermal paste, wherein the counter holder is switchable between an impression operating position and a supporting operating position, wherein in the impression operating position, a counter holder support surface is adjustable in a dimensionally flexible manner, so that the counter holder support surface adapts to a surface contour of the housing base lower side, and wherein, in the supporting operating position, the counter holder support surface adapted to the contour of the housing base lower side is dimensionally rigid, so that the counter holder support surface supports the housing base against the viscosity force of the thermal paste.

2. The method according to claim 1, wherein in the impression operating position, the dimensionally flexible counter holder support surface forms a negative shape of the surface contour of the housing base lower side, so that a large-area, gap-free contact is produced between the housing base lower side and the counter holder support surface that is adapted to the surface contour.

3. The method according to claim 1, wherein the counter holder has a plurality of counter holder segments which are mounted in a counter holder base body in a stroke-adjustable manner independently of one another, and wherein in the impression operating position, segment surfaces of the counter holder segments are brought into contact with the housing base lower side, and wherein the segment surfaces of all counter holder segments form the counter holder support surface.

4. The method according to claim 3, wherein in the supporting operating position, the counter holder segments are adjusted into an impression stroke position, in which the segment surfaces of the counter holder segments are in contact with the housing base lower side.

5. The method according to claim 3, wherein the counter holder has a mounting frame, which moves around the counter holder segments, wherein the battery housing is positioned on an edge on the mounting frame in the module setting process, and/or wherein, when the battery housing is placed on the mounting frame, the counter holder is in the impression operating position, in which the counter holder segments adapt to the surface contour of the housing base lower side.

6. The method according to claim 3, wherein the counter holder has a locking unit, by which the stroke-adjustable counter holder segments can be fixed in the supporting operating position in an impression stroke position.

7. The method according to claim 3, wherein the counter holder segments are spring-loaded by restoring springs, and/or the counter holder segments are adjusted into an impression stroke position while building up an elastic restoring force.

8. The method according to claim 7, wherein the restoring force of the restoring springs is selected exactly so that the counter holder segments do not exert any force on the housing base lower side during the stroke adjustment into the impression stroke position and the counter holder segments are in contact almost without force with the housing base lower side during the stroke adjustment of the counter holder segments.

9. The method according to claim 1, wherein the thermal paste is applied to the housing bottom of the battery housing before the module setting process is carried out, so that during the setting process, the respective battery module is pressed with a pressing force against the thermal paste, whereby the thermal paste is uniformly distributed in the air gap under compression, or the thermal paste is injected after the module setting process in an injection process into the air gap between the battery module and the housing base.

* * * * *